United States Patent
Kang et al.

(10) Patent No.: US 7,773,700 B2
(45) Date of Patent: Aug. 10, 2010

(54) APPARATUS FOR CHANNEL EQUALIZATION AND METHOD THEREOF

(75) Inventors: Kyung Won Kang, Seoul (KR); Woo Chan Kim, Gyeonggi-do (KR); In Hwan Choi, Seoul (KR); Byoung Gill Kim, Seoul (KR); Yong Hak Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 937 days.

(21) Appl. No.: 11/178,117

(22) Filed: Jul. 8, 2005

(65) Prior Publication Data

US 2006/0023799 A1 Feb. 2, 2006

(30) Foreign Application Priority Data

Jul. 29, 2004 (KR) .................. 10-2004-0059713

(51) Int. Cl.
*H04L 27/06* (2006.01)
*H03H 7/30* (2006.01)
(52) U.S. Cl. ............... 375/341; 375/260; 375/229
(58) Field of Classification Search .......... 375/260, 375/341, 346, 259, 340, 316
See application file for complete search history.

(56) References Cited

U.S. PATENT DOCUMENTS 7,058,422 B2 * 6/2006 Learned et al. ............. 455/526

| | | | |
|---|---|---|---|
| 2003/0016645 A1 * | 1/2003 | Siala et al. | 370/342 |
| 2003/0022649 A1 * | 1/2003 | Voyer | 455/277.1 |
| 2004/0125235 A1 * | 7/2004 | Kim et al. | 348/607 |
| 2005/0123074 A1 * | 6/2005 | Kim et al. | 375/340 |
| 2005/0275576 A1 * | 12/2005 | Fudge et al. | 341/155 |
| 2006/0029146 A1 * | 2/2006 | Catreux et al. | 375/267 |
| 2007/0104264 A1 * | 5/2007 | Park et al. | 375/233 |

* cited by examiner

*Primary Examiner*—David C Payne
*Assistant Examiner*—Brian J Stevens
(74) *Attorney, Agent, or Firm*—Lee, Hong, Degerman, Kang & Waimey (57) ABSTRACT

Channel Equalization of a digital TV is disclosed. In channel equalization for restoring an original signal from a digital TV reception signal having passed through a channel, the present invention includes estimating an impulse response of the channel from a received signal having passed through the channel using conjugate-gradient algorithm, finding an equalizer coefficient in a frequency domain using the estimated impulse response of the channel, outputting a signal equalized by multiplying a signal resulting from transforming the received signal into the frequency domain by the found equalizer coefficient, and predicting to remove an amplified noise of the equalized signal using the conjugate-gradient algorithm in a time domain. Accordingly, the variation of the channel impulse response according to time can be tracked in the dynamic channel having fast channel variation as well as the static channel, whereby equalizing performance can be enhanced.

15 Claims, 7 Drawing Sheets

APPARATUS FOR CHANNEL EQUALIZATION AND METHOD THEREOF

This application claims the benefit of the Korean Patent Application No. 10-2004-0059713, filed on Jul. 29, 2004, which is hereby incorporated by reference as if fully set forth herein.

BACKGROUND OF THE INVENTION

1. Field of the Invention

The present invention relates to a digital TV channel equalizer, and more particularly, to an apparatus for channel equalization and method thereof. Although the present invention is suitable for a wide scope of applications, it is particularly suitable for performing equalization in a frequency domain using conjugate-gradient algorithm.

2. Discussion of the Related Art

Generally, a digital transceiver system maps digital information (e.g., voice, data and video) of a transmitting end into symbols, converts each of the symbols to an analog signal proportional to a size or phase, and then transmits the analog signal to a receiving end over a transport channel. In doing so, interfering with a neighbor signal while passing through the transport channel of multi-path, the signal arriving at the receiving end is severely distorted. Hence, an equalizer is needed for channel compensation to restore an original signal from the distorted received signal.

Currently, as an equalizer mostly adopted by a receiver for a single carrier transmission system such as the U.S. terrestrial broadcasting, there is a non-linear decision feedback equalizer, which is explained with reference to FIG. 1 as follows.

Figure 1:
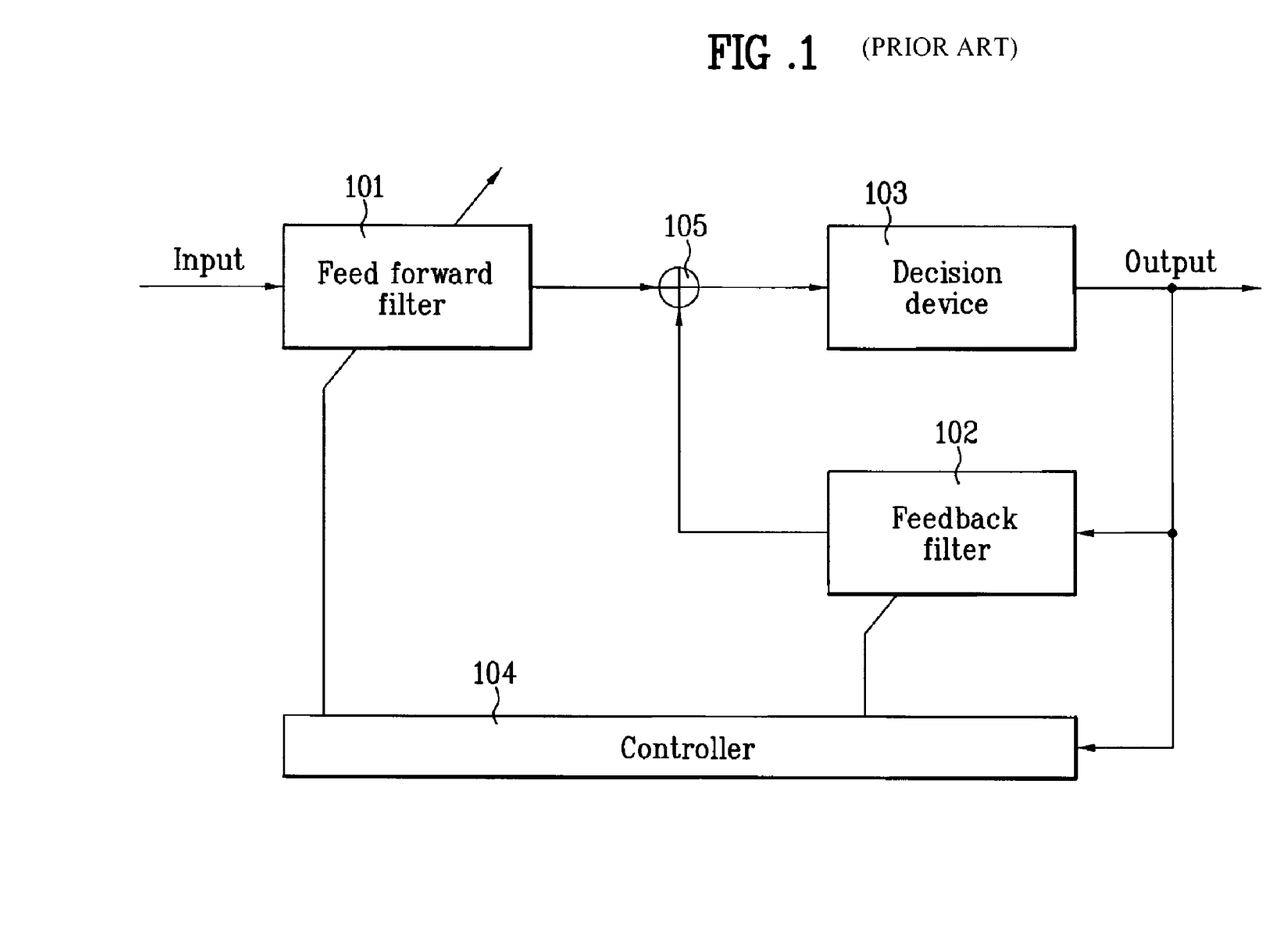
FIG. 1 is a block diagram of a non-linear decision feedback equalizer according to a related art.

FIG. 1 is a block diagram of a non-linear decision feedback equalizer according to a related art.

An operation of a non-linear decision feedback equalizer is explained with reference to FIG. 1.

First of all, after an influence of a pre-ghost that is a signal of a path arriving earlier than a main path via a feedforward (front-end) filter 101 has been removed, an influence of a post-ghost that is a signal of a path arriving later than a main path via a feedback (rear-end) filter 102 is removed.

In doing so, an adder 105 adds an output of the front-end filter 101 and an output of the feedback filter 102 and then outputs its output signal to a decision device 103. The decision device 103 compares the output signal of the adder 105 to a preset reference value to decide the output signal of the adder 105 as a signal level having a closest distance. In this case, an output of the decision device 103 becomes an input value to the feedback filter 102 and a controller 104.

If a decision of the decision device 103 is made accurately, the output signal is re-inputted as an input of the feedback filter 102 while noise included in an equalizer output component is removed to avoid noise amplification. Hence, the nonlinear decision feedback equalizer has performance better than a general linear equalizer.

Yet, in case that channel distortion is considerable, a decision error frequently occurs in a decision value that becomes an input of the feedback filter 102. And, an error propagation situation, in which the wrong decision value keeps circulating an infinite loop within the feedback filter 102 to degrade performance of an equalizer, may take place.

If the main path is blocked so that a signal received via a reflective path exists only or if a same signal is transmitted via different paths (single frequency network: SFN), a situation that incoming energy via each of the paths becomes similar may happen. So, it becomes unclear which signal will be taken as a main.

Namely, if positions of the main and reflective paths in a time-domain equalizer are frequently varied, performance degradation of the equalizer. So, it becomes impossible to perform channel decoding in a rear end of the equalizer in case of fluctuation of frame synchronization.

To solve such a problem, a zero forcing (ZF) frequency domain channel equalizer using a channel estimator and a noise predictor was proposed.

Figure 2:
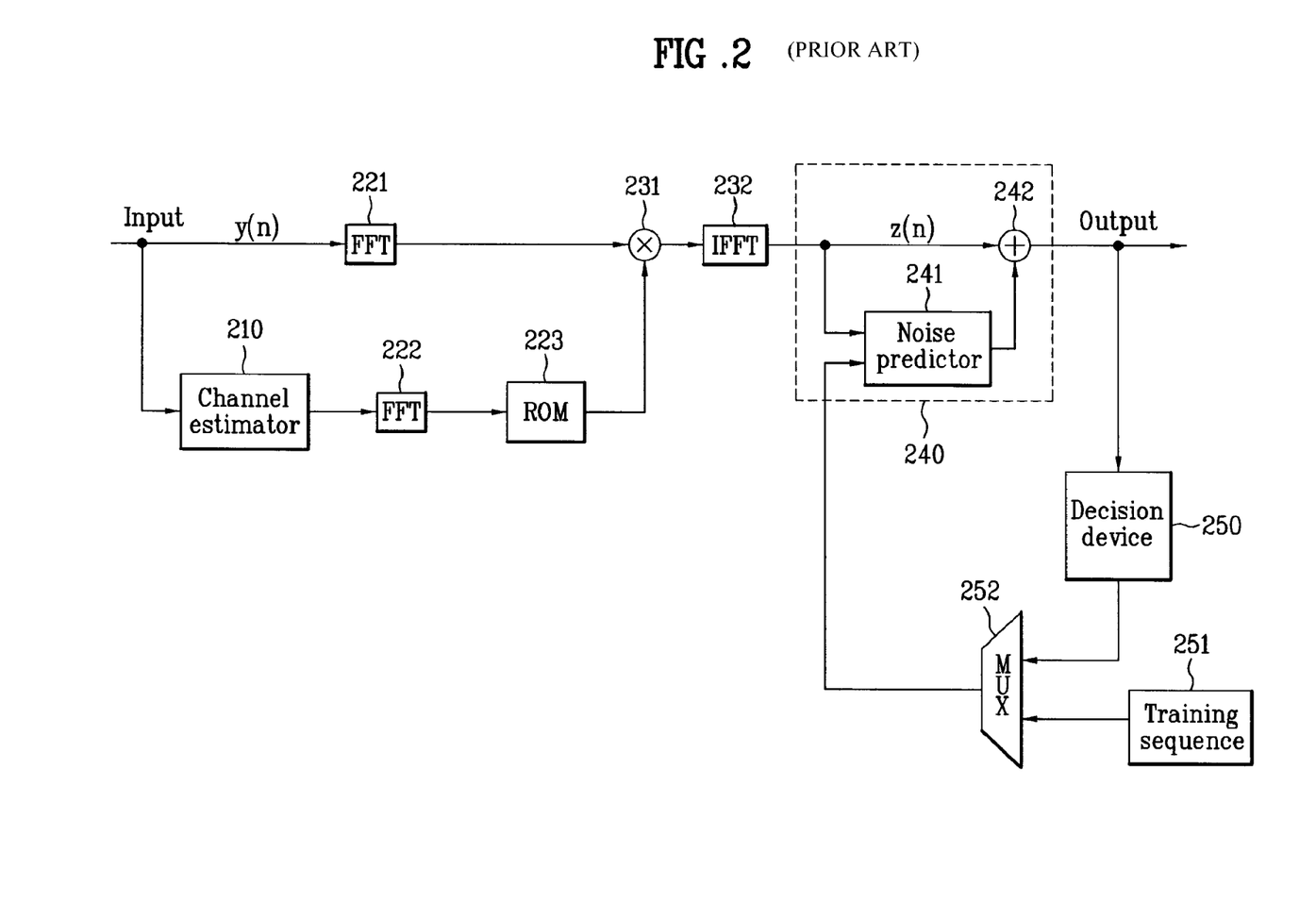
FIG. 2 is a block diagram of a ZF (zero forcing) frequency domain channel equalizer.

FIG. 2 is a block diagram of a ZF (zero forcing) frequency domain channel equalizer.

Referring to FIG. 2, a channel estimator 210 outputs an estimated channel $\hat{h}^{(n)}$ by accurately estimating a transport channel h(n) in viewpoint of a least square sense using a training signal inserted in a transmission signal.

The estimated channel $\hat{h}^{(n)}$ is transformed into a frequency domain $\hat{H}^{(w)}$ in an FFT (fast Fourier transform) 222. The frequency domain $\hat{H}^{(w)}$ is transformed into $\hat{H}^{-1^{(w)}}$ as a frequency response of a reverse channel via a ROM table 223. And, a complex multiplier 231 multiplies the $\hat{H}^{-1^{(w)}}$ by reception data Y(w) transformed into a frequency domain in the FFT 221.

An output of the complex multiplier 231 is reverse-transformed into a time domain again by an IFFT (inverse fast Fourier transform) 232, whereby a ZF type channel equalization end time domain data symbol is obtained.

Noise amplified in the process of equalization is removed by a noise remover 240 provided to a rear end of the equalizer. The noise-removed signal is determined by a decision device 250 to be outputted as a decision value closest to an output of the equalizer to a MUX 252.

The MUX 252 is a sort of selector that selects a training sequence of a training signal generator 251 in a training signal section or an output of the decision device 250 in a data section to output to a noise predictor 241.

The above-configured frequency domain ZF equalizer exhibits excellent performance in a static multi-path channel. Yet, since the channel estimator updates an equalizer coefficient by estimating a channel in a frame sync section only, the equalizer has a disadvantage that equalization is barely performed in a dynamic channel.

To compensate such a disadvantage, a frequency domain LMS equalizer has been proposed. The frequency domain LMS equalizer finds an equalizer coefficient from a frame sync using a channel estimator and enhances equalizing performance in a dynamic channel by updating the equalizer coefficient using LMS algorithm in a data section, which is explained with reference to the attached drawing as follows.

Figure 3:
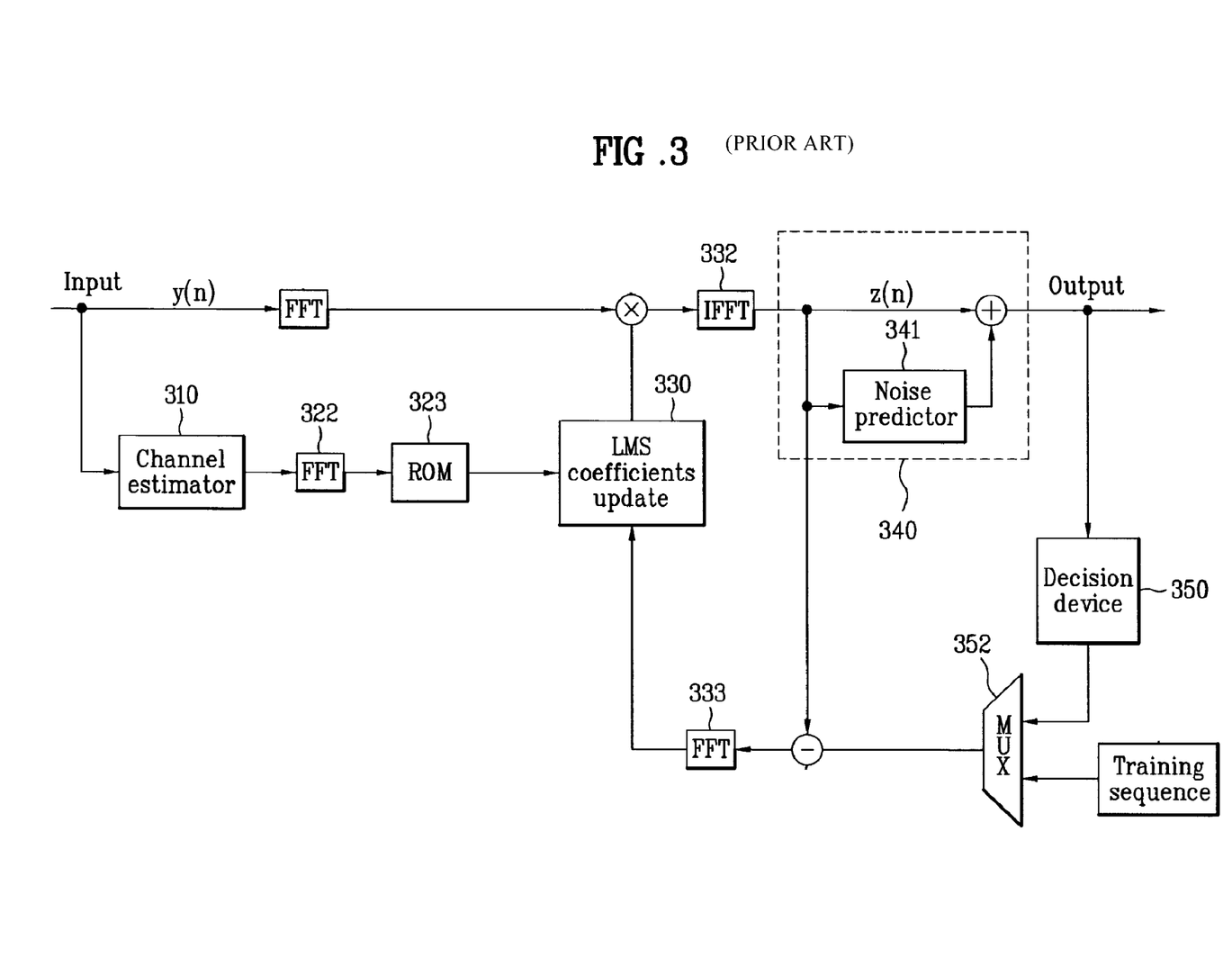
FIG. 3 is a block diagram of a frequency domain LMS equalizer.

FIG. 3 is a block diagram of a frequency domain LMS equalizer.

Referring to FIG. 3, like the frequency domain ZF equalizer, a channel estimator 310 outputs an estimated channel $\hat{h}^{(n)}$ by accurately estimating a transport channel h(n) in viewpoint of a least square sense using a training signal inserted in a transmission signal. The estimated channel $\hat{h}^{(n)}$ is transformed into a frequency domain in an FFT (fast Fourier transform) 322. The frequency-domain-transformed estimated channel is transformed into $\hat{H}^{-1^{(w)}}$ as a frequency response of a reverse channel via a ROM table 323.

The $\hat{H}^{-1^{(w)}}$ is used as an initial coefficient of the frequency domain LMS equalizer. Namely, a channel is compensated in a manner of performing adaptive equalization on a transport channel distorted for a data section having the initial coefficient using LSM type algorithm.

For this, an LMS coefficient update unit 330 updates the equalizer coefficient using LMS algorithm in the data section. And, a next signal is used as an input value of the LMS coefficient update unit 330.

Namely, the data equalized in the frequency domain is inverse-transformed into a time domain via an IFFT 332 to obtain a channel equalization end time domain data symbol. And, the signal becomes an input signal of a noise predictor 341 to remove noise amplified in the equalization process.

The noise-removed clear signal becomes a decision value closest to an output of the equalizer via a decision device 350. And, an error in the equalizer output is found a MUX 352 using the decision value. The error is transformed into the frequency domain by an FFT 333 to become an input value of the LMS coefficient update unit 330 so that the equalizer coefficient in the frequency domain is updated.

Thus, the LMS equalizer is advantageous in performing channel equalization in a dynamic channel by updating the coefficient of the equalizer in the data section using the LMS algorithm. Yet, it is disadvantageous that the LMS algorithm has a slow convergence speed despite the advantage of stable convergence in an environment having a poor channel and a considerable noise.

Hence, the frequency domain equalizer using the LMS algorithm has performance better than that of the ZF frequency domain equalizer but fails in performing channel equalization in such a fast dynamic channel as a moving vehicle or a roadside.

SUMMARY OF THE INVENTION

Accordingly, the present invention is directed to an apparatus for channel equalization and method thereof that substantially obviate one or more problems due to limitations and disadvantages of the related art.

An object of the present invention is to provide an apparatus for channel equalization and method thereof, by which equalizing performance of an equalizer is enhanced in a dynamic channel using conjugate-gradient algorithm instead of LMS algorithm.

Another object of the present invention is to provide an apparatus for channel equalization and method thereof, by which equalizing performance of an equalizer is enhanced by obtaining a decision value having high reliance in a data section using a viterbi decoder.

A further object of the present invention is to provide an apparatus for channel equalization and method thereof, by which configurations of indirect and direct equalization type equalizers using conjugate-gradient algorithm are proposed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in channel equalization for restoring an original signal from a digital TV reception signal having passed through a channel, a channel equalization method according to the present invention includes the steps of estimating an impulse response of the channel from a received signal having passed through the channel using conjugate-gradient algorithm, finding an equalizer coefficient in a frequency domain using the estimated impulse response of the channel, outputting a signal equalized by multiplying a signal resulting from transforming the received signal into the frequency domain by the found equalizer coefficient, and predicting to remove an amplified noise of the equalized signal using the conjugate-gradient algorithm in a time domain.

Preferably, in the channel impulse response estimating step, the channel impulse response is estimated using a previously stored training sequence in a training signal section of the received signal or a decision value of the noise-removed signal in a data section.

More preferably, the decision value of the noise-removed signal is decided using viterbi algorithm.

In another aspect of the present invention, in channel equalization for restoring an original signal from a digital TV reception signal having passed through a channel, a channel equalization method includes the steps of finding an equalizer coefficient from a received signal having passed through the channel using conjugate-gradient algorithm, outputting a signal equalized by multiplying a signal resulting from transforming the received signal into a frequency domain by the equalizer coefficient, and predicting to remove an amplified noise of the equalized signal using the conjugate-gradient algorithm in a time domain.

Preferably, the equalizer coefficient finding step uses a previously stored training sequence in a training signal section of the received signal or a decision value of the noise-removed signal in a data section.

In another aspect of the present invention, in channel equalization for restoring an original signal from a digital TV reception signal having passed through a channel, a channel equalization apparatus includes a channel estimator estimating an impulse response of the channel from a received signal having passed through the channel in a manner that a previously stored training sequence in a training signal section or a channel-equalized signal is fed back to the channel estimator using conjugate-gradient algorithm, a coefficient calculator finding an equalizer coefficient in a frequency domain using the estimated impulse response of the channel, a multiplier outputting a signal equalized by multiplying a signal resulting from transforming the received signal into the frequency domain by the found equalizer coefficient, and a noise removing unit predicting to remove an amplified noise of the equalized signal using the conjugate-gradient algorithm in a time domain.

In a further aspect of the present invention, in channel equalization for restoring an original signal from a digital TV reception signal having passed through a channel, a channel equalization apparatus includes a coefficient calculator finding an equalizer coefficient from a received signal having passed through the channel in a manner that a previously stored training sequence in a training signal section or a channel-equalized signal is fed back to the channel estimator using conjugate-gradient algorithm, a multiplier outputting a signal equalized by multiplying a signal resulting from transforming the received signal into a frequency domain by the found equalizer coefficient, and a noise removing unit predicting to remove an amplified noise of the equalized signal using the conjugate-gradient algorithm in a time domain.

Therefore, the present invention is characterized in enhancing equalizing performance by tracking a variation of a channel impulse response according to a time in a dynamic channel having a fast channel variation as well as a static channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Besides, the terms used in the present invention are mainly selected from currently usable global and general terms. Yet, most appropriate terms are arbitrarily used by the applicant to keep up with the appearance of new technologies. And, the meanings of the arbitrarily used terms will be clearly explained in the corresponding description. Hence, in apprehending the present invention, the present invention should be understood not by the simple names of the terms but by the meanings of the terms.

Figure 4:
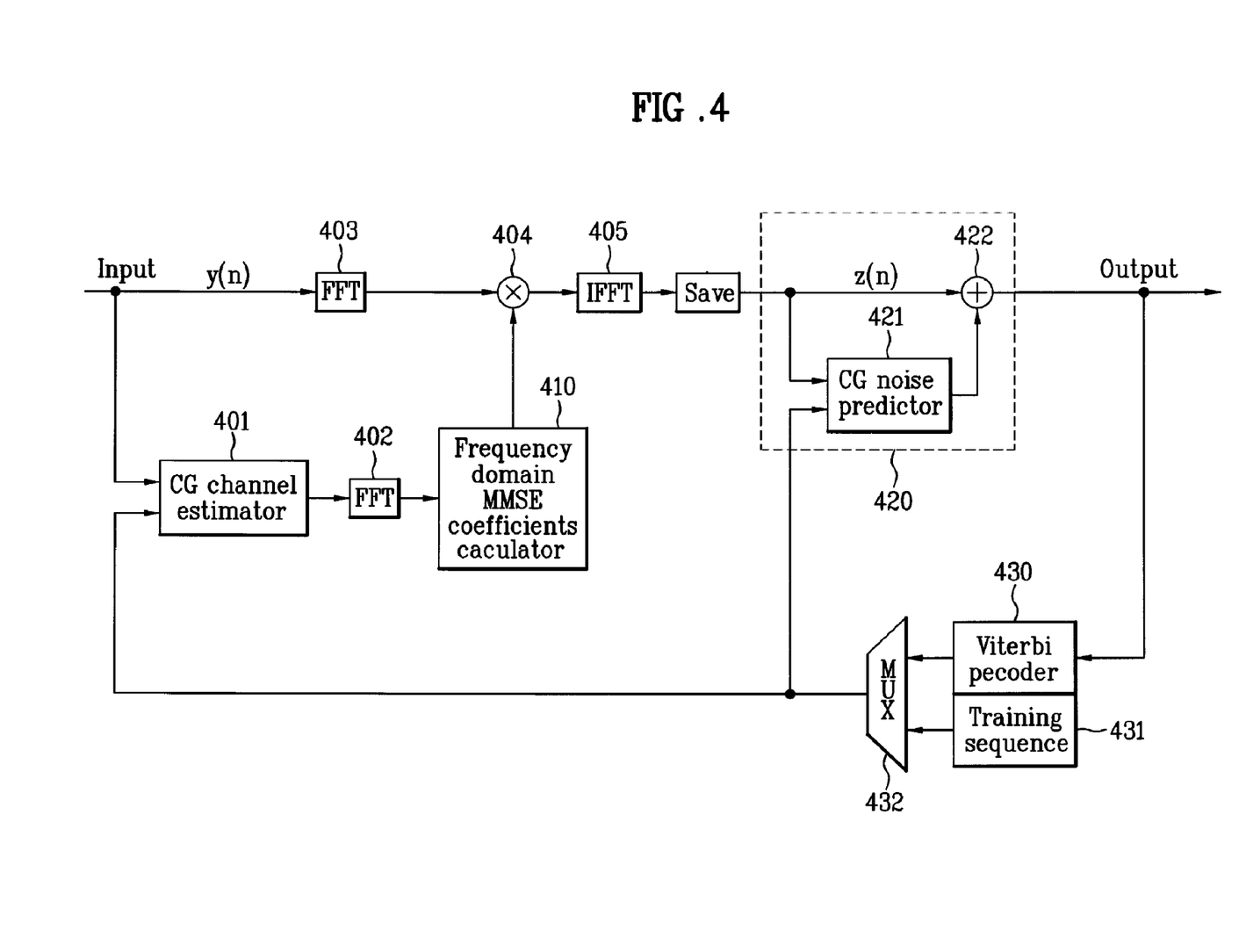
FIG. 4 is a block diagram of an indirect equalization type channel equalizer using CG algorithm according to the present invention.

FIG. 4 is a block diagram of an indirect equalization type channel equalizer using conjugate-gradient (CG) algorithm according to the present invention.

Referring to FIG. 4, an equalizer according to the present invention basically includes three parts. Namely, the equalizer according to the present invention includes a CG channel estimator 401 estimating an impulse response of a channel from a received signal using conjugate-gradient (CG) algorithm, an MMSE coefficient calculator 410 finding a coefficient minimizing a minimum mean square error (MMSE) using the estimated impulse response of the channel, and a noise removing unit 420 predicting a colored noise among noises amplified in an equalizing unit using the CG algorithm.

Operational relations of the above-configured equalizer according to the present invention are explained by block unit according to a signal flow as follows.

First of all, a case of the CG channel estimator 401 is explained. If a transmission signal is x(n), if an impulse response of a discrete equivalent channel is h(n) and if a white noise is w(n), a received signal y(n) can be expressed by Equation 1.

$$y(n) = \sum_k h(k) * x(n-k) + w(n) \quad \text{[Equation 1]}$$

For the reception signal y(n) expressed by Equation 1, the channel estimator 401 carries out a function of outputting a finite impulse response estimated value h(n) of a channel in a manner of receiving the reception signal y(n) and estimating the impulse response h(n) of the discrete equivalent channel through which the transmission signal x(n) may have passed.

In doing so, as a simplest method of estimating the impulse response h(n) of the channel, there is a simple correlation method (SCM) of finding a cross correlation value between a training signal previously stored in a receiving end a training signal coming through the channel by assuming that a training signal periodically added to the transmission signal is a white signal. Namely, a correlation between the reception signal y(n) of Equation 1 and a training sequence x(n) previously stored in the receiving end is taken.

Assuming that an auto-correlation of the training sequence is an impulse function δ(n), the impulse response can be found by Equation 2.

$$E\{y(n)x(n)\} = \sum_k h(k)E\{x(n-k)x(n)\} + E\{w(n)x(n)\} \quad \text{[Equation 2]}$$
$$= \sum_k h(k)\sigma(n-k)$$
$$= h(n)$$

Such a method, which is so simple, can be implemented by small hardware. Yet, if the training signal does not exhibit the feature of white, there exists a considerable estimation error. Furthermore, if a channel estimation area is widened, influence of data existing at both sides of the training signal is increased. Hence, it is impossible to fulfill accurate channel estimation.

Meanwhile, the least square method (LSM) known as a relatively accurate estimation method enables channel estimation more accurate that the simple correlation method (SCM) even if the training signal does not exhibit the feature of white. Hence, if the auto-correlation of the training signal in Equation 2 is not an impulse function, Equation 2 can be adjusted into Equation 3.

$$E\{y(n)x(n)\} = p \quad \text{[Equation 3]}$$
$$= E\{x(n)x(n)\}h(n)$$
$$= Rh(n)$$

From Equation 3, the impulse response of channel can be found by Equation 4.

$$h(n) = R^{-1}p \quad \text{[Equation 4]}$$

From Equation 4, since the LSM (least square method) makes compensation by multiplication of an $R^{-1}$ matrix as an auto-correlation component of data, more accurate impulse response estimation of channel is possible.

The least square method (LSM) needs hardware having complexity higher than that of the auto-correlation method but provides more accurate estimation channel. Yet, the longer a length of the channel gets, the bigger a size of an auto-correlation matrix R becomes. So, if the channel becomes longer, a corresponding operation load grows in a geometrical progression. Hence, its implementation is substantially impossible.

Various methods for finding $R^{-1}p$ by repetitive operation have been proposed. And, a representative repetition algorithm is steepest-decent algorithm. In the steepest-decent algorithm, used is the fact that a problem of finding $R^{-1}p$ is equivalent to minimizing a secondary expression like Equation 5.

$$f(x) = \frac{1}{2}x^T R x - p^T x + c \qquad \text{[Equation 5]}$$

In this case, 'C' is an arbitrary constant. If Equation 5 is differentiated, Equation 6 is found.

$$f'(x) = Rx - p \qquad \text{[Equation 6]}$$

If a value of the above equation equals to zero, a secondary function of Equation 5 has a minimal value. And, a value 'x' satisfying this condition follows Equation 7.

$$f'(x) = Rx - p = 0$$

$$Rx = p$$

$$x = R^{-1}p \qquad \text{[Equation 7]}$$

If the value 'x' minimizing f(x) is found from Equation 7, it can be known that $R^{-1}p$ can be found.

In the steepest-decent algorithm, x is moved from a current position x(i) by a in a direction r(i) having a most abruptly decreasing mean square error whenever the repetitive operation is executed to find x minimizing the mean square error. So, it converges to the x to be found. This is explained with reference to the attached drawing as follows.

Figure 5:
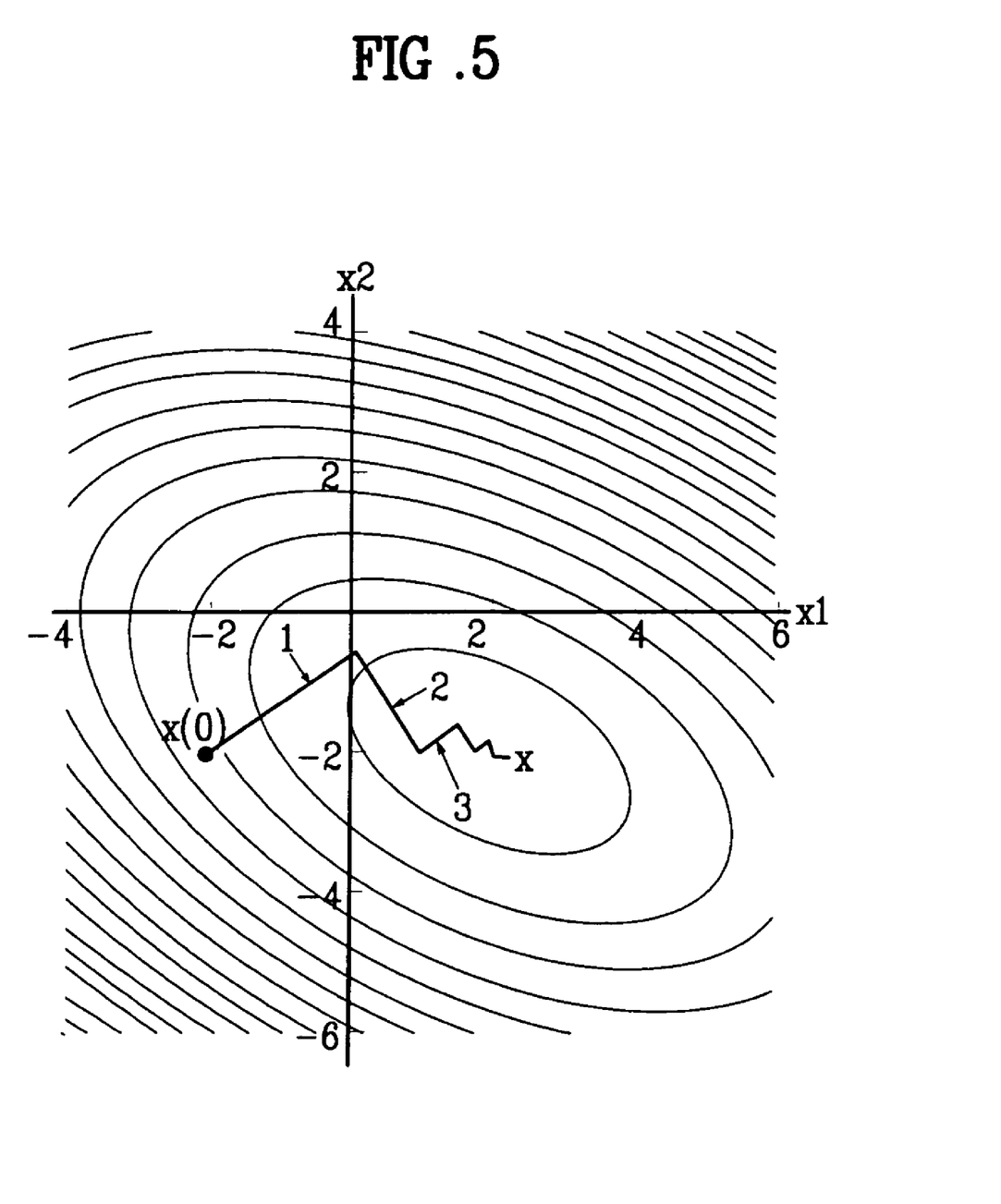
FIG. 5 is a graph of a convergence characteristic of steepest-decent algorithm.

FIG. 5 is a graph of a convergence characteristic of steepest-decent algorithm, in which a 2-dimensional plane has two taps and in which points having the same mean square error (MSE) are connected by a line.

Referring to FIG. 5, in the steepest-decent algorithm, x(i) is moved from a current position x(0) with a displacement α in a direction r(i) having a most abruptly decreasing mean square error. And, the α represents a distance to a point having a minimal means square error when x(i) moves in the direction r(i). Hence, such a process is repeated so that x(0) converges to 'x' having the smallest mean square error.

The steepest-decent algorithm, as can be known by FIG. 5, may move in the same direction of the motion of a previous repetitive operation while converging to x. Namely, a moving direction of a process 1 is equal to that of a process 3 in FIG. 5.

Unlike the steepest-decent algorithm of several movements in the same direction, a value x is moved once in one direction to improve a converging speed in conjugate-gradient algorithm.

Namely, a concept of the conjugate-gradient algorithm is that x is moved one time in one direction by finding a direction vector d(i) configuring a mean square error plane. This is explained with reference to FIG. 6 as follows.

Figure 6:
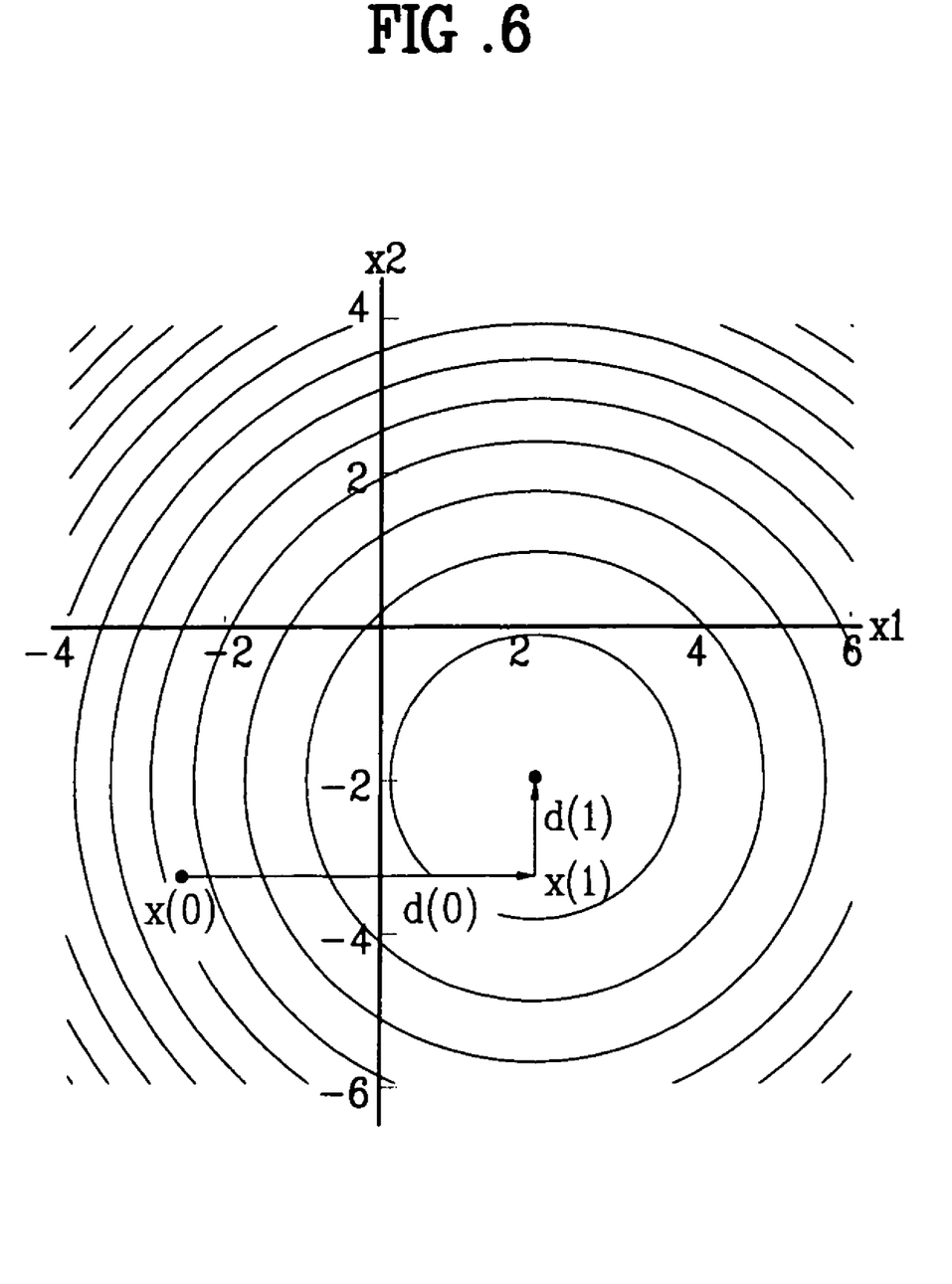
FIG. 6 is a graph of a convergence characteristic of conjugate-gradient algorithm.

FIG. 6 is a graph of a convergence characteristic of conjugate-gradient algorithm.

Referring to FIG. 6, if a mean square error plane is a 2-dimensional plane, there exist two direction vectors d(0) and d(1). So, by performing two repetitive operations only from an initial start point x(0), a solution x can be found.

A repetitive operation process of the conjugate-gradient algorithm can be expressed by Equation 8.

[Equation 8]

$$d(0) = r(0) = p - Rx(0) \qquad (1)$$

$$\alpha(i) = \frac{r(i)^{Tr}r(i)}{d(i)^T R d(i)} \qquad (2)$$

$$X(i+1) = X(i) + \alpha(i)d(i) \qquad (3)$$

$$r(i+1) = r(i) - \alpha(i)Rd(i) \qquad (4)$$

$$\beta(i+1) = \frac{r(i+1)^T r(i+1)}{r(i)^T r(i)} \qquad (5)$$

$$d(i+1) = r(i+1) + \beta(i+1)d(i) \qquad (6)$$

In Equation 8, steps (2) to (6) are repeated as many as a dimensional number of the mean square error plane.

As mentioned in the above explanation, unlike the steepest-decent algorithm, the conjugate-gradient algorithm make one movement to an optimal distance once in one direction on the mean square error plane, thereby having a convergence characteristic faster than that of the steepest-decent algorithm. Hence, in the same channel environment, a converging speed of the conjugate-gradient algorithm is faster than that of the LMS algorithm based on the steepest-decent algorithm.

Moreover, the related art method uses the training sequence section only in channel estimation. Yet, the CG channel estimator 401 according to the present invention receives an output value of the viterbi decoder 430 to provide a decision value having high reliance in the data section as well as the training sequence section.

Namely, the CG channel estimator 401 conveniently calculates a channel estimation value according to the LMS using the conjugate-gradient algorithm, thereby enabling channel estimation in the data section to enhance equalization performance in the dynamic channel as well.

Meanwhile, the channel estimated by the CG channel estimator 401 according to the present invention is transformed into the frequency domain via the FFT unit 402. And, the frequency domain MMSE coefficient calculator 410 calculates the equalizer coefficient satisfying the condition of minimizing the mean square error using the impulse response of the estimation channel transformed into the frequency domain.

A process of calculating the equalizer coefficient in the MMSE coefficient calculator 410 is explained as follows.

First of all, assuming that a transmitted signal, a reception signal and an equalizer coefficient are $x_k$, $y_k$ and $w_k$, respectively, an error in an equalizer output is expressed by Equation 9.

$$e_k = x_k - w_k y_k \qquad \text{[Equation 9]}$$

A z-transformation is carried out on Equation 9 to express Equation 10.

$$E(z) = X(z) - W(z)Y(z) \qquad \text{[Equation 10]}$$

In this case, an error signal $e_k$ and an equalizer input signal $y_k$ are uncorrelated by principle of orthogonality, which can be expressed by Equation 11.

$$E[E(z)Y^*(z^{-*})] = 0 \qquad \text{[Equation 11]}$$

Hence, if Equation 110 is substituted for Equation 10, Equation 12 is found.

$$E[X(z)Y^*(z)] = W(z)^* E[Y(z)Y^*(z)] \qquad \text{[Equation 12]}$$

Each term of Equation 12 is calculated as follows.

$$E[X(z)Y^*(z)] = H(z)\xi_x \quad \text{[Equation 13]}$$

$$E[Y(z)Y^*(z)] = H^2(z)\xi_x + \frac{N_0}{2}H(z)$$

In this case, $\xi_x$ is energy of the transmission signal $x_k$, $H(z)$ is a frequency response of channel, and $N_0/2$ is power of noise. Equation 13 is substituted for Equation 12 to be adjusted as follows.

$$W(z) = E\left[X(z)Y^* \frac{(z)}{E[Y(z)Y^*(z)]}\right] \quad \text{[Equation 14]}$$

$$= \frac{1}{(H(z) + (N_0/2\xi_x))}$$

$$= \frac{1}{H(z) + 1/SNR},$$

where $SNR = \frac{2\xi_x}{N_0}$

An equalizer coefficient of Equation 14 is the equalizer coefficient that minimizes the mean square error. Hence, the frequency domain MMSE coefficient calculator finds the coefficient of the frequency domain equalizer minimizing the mean square error by performing an operation of Equation 14 using the impulse response of the channel transformed into the frequency domain by the FFT 402.

Meanwhile, the received signal y(n) is transformed into N frequency bins via the FFT unit 403. A bin product between the N frequency bins and an impulse response value of a reverse channel according to the equalizer coefficient calculated by the frequency domain MMSE coefficient calculator 410 is performed by the multiplier 404.

In this case, the bin product means a multiplication of the same frequency bins. The bin product of two signals in the frequency domain corresponds to circular convolution in the time domain. A product result of the multiplier 404 corresponds to equalization of the frequency domain.

The equalized frequency bin is outputted to the IFFT 405 to be reversely transformed into the time domain.

A colored noise v(n) of the equalized signal reversely transformed into the time domain is whitened. Namely, a noise v(n) predicted by the noise predictor 421 of the noise removing unit 420 is subtracted from the equalizer output expressed as a total x(n)+v(n) of the equalized signal and the amplified noise, whereby the colored noise v(n) is whitened. Such an operation of the noise predictor 421 is explained in detail as follows.

First of all, a signal resulting from the received signal y(n) through the equalizer is expressed by Equation 15.

$$x(n) + w(n) * h^{-1}(n) = x(n) + \sum_k w(k)h^{-1}(n-k) \quad \text{[Equation 15]}$$

$$= x(n) + v(n)$$

In this case, x(n) is an ideally equalized original signal and v(n) as the colored noise is an output resulting from a convolutional operation between the impulse response of the reverse channel and a white nose w(n) added in reception. The noise predictor 421 projects the colored noise v(n) to a plane developed by a random vector set of V={v(n−1), v(n−2), . . . , v(n−L)} to find a predicted $\hat{v}^{(n)}$ using the fact that v(n) has correlation with a past value.

Hence, the noise removal is performed in a manner of removing the noise amplified in equalization by subtracting the predicted value from v(n) via the subtracter 422 to whiten the noise v(n).

In the related art method, the LMS algorithm is used for the noise prediction. Yet, the related art method is disadvantageous in tracking the channel variation in the dynamic channel. In the present invention, the solution of Wiener-Hopf Equation for noise prediction is directly found using the conjugate-gradient algorithm instead of the LMS algorithm. This is explained in detail as follows.

First of all, the Wiener-Hopf Equation for finding v(n) from the random vector set V is configured as follows.

$$R_v w_f = p_v \quad \text{[Equation 16]}$$

$$R_v = E\{VV^H\}$$

$$= \begin{bmatrix} r(0) & r(1) & \ldots & r(L-1) \\ r^*(1) & r(0) & \ldots & r(L-2) \\ \vdots & \vdots & \ldots & \vdots \\ r^*(L-1) & r^*(L-2) & \ldots & r(0) \end{bmatrix}$$

$$p = E\{Vv^*(n)\}$$

$$= \begin{bmatrix} r^*(1) \\ r^*(2) \\ \vdots \\ r^*(L) \end{bmatrix}$$

In Equation 16, r(k) is an auto-correlation function of a random noise predicting process V if a time delay is k. A coefficient of the noise predictor 421 can be found from Equation 16 as follows.

$$w_f = R_v^{-1} p_v \quad \text{[Equation 17]}$$

In Equation 17, an inverse matrix is not directly found to find $w_f$. Instead, the coefficient is found by the repetitive operation using the aforesaid conjugate-gradient algorithm.

The noise predicted in the above manner is subtracted from v(n) through the subtracter 422 to whiten the noise v(n), whereby the noise amplified in equalization is removed.

The noise-removed signal results in an accurate decision value in the data section again and is then inputted to the viterbi decoder 430 to generate an error for an update of a new equalization coefficient.

The viterbi decoder 430 outputs a decision value closest to the output of the equalizer to the MUX 432. The MUX 432, which is a sort of a selector, selects the training sequence of the training signal generator 431 in a training signal section or an output value of the viterbi decoder 430 in the data section to output as an ideal or reference value of the equalizer. Namely, an output of the MUX 432 is outputted to the noise removing unit 420 and the CG channel estimator 401.

Hence, by using the output value of the viterbi decoder 430 in the data section or the training sequence of the training signal generator 431 in the training sequence section, the coefficient of the noise predictor 421 within the noise removing unit 420 or the channel impulse response of the CG channel estimator 401 is found.

As mentioned in the aforesaid description, the coefficient of the equalizer is found through the MMSE coefficient calculator in the frequency domain using the found channel impulse response value.

Meanwhile, the above-explained equalizer is the indirect equalization type equalizer finding the coefficient of equalizer using the impulse response after the impulse response of the channel has been found.

Alternatively, it is able to implement a direct equalization type equalizer that directly updates a coefficient using input data of the equalizer and a decision value of an equalizer output. A direct equalization type equalizer using conjugate-gradient algorithm according to the present invention is explained with reference to FIG. 7 as follows.

Figure 7:
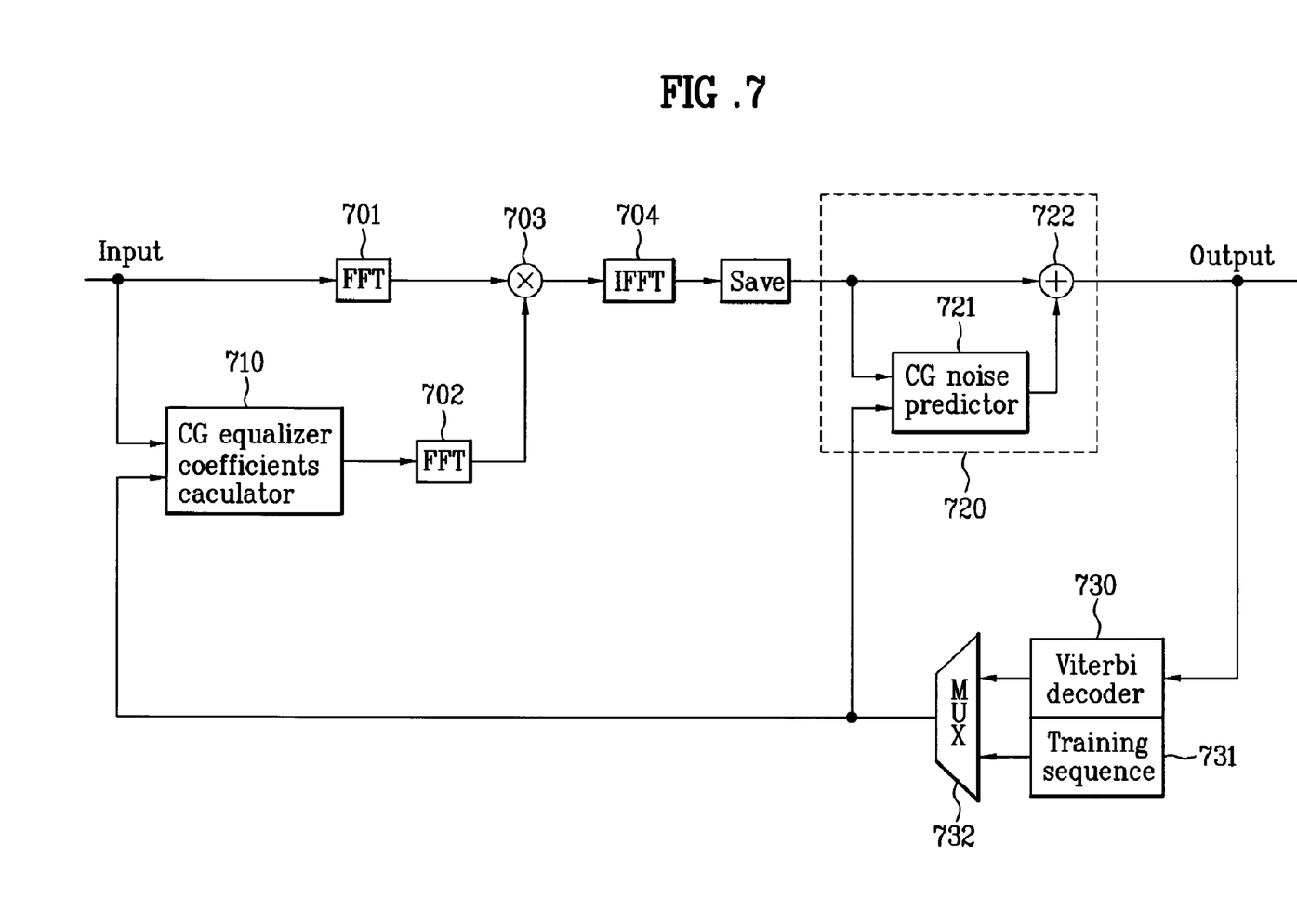
FIG. 7 is a block diagram of a direct equalization type channel equalizer using conjugate-gradient algorithm according to the present invention.

FIG. 7 is a block diagram of a direct equalization type channel equalizer using conjugate-gradient algorithm according to the present invention.

Referring to FIG. 7, a direct equalization type channel equalizer according to the present invention finds a solution of Wiener-Hopf equation by a repetitive operation using input data of a CG equalizer coefficient calculator 710 and output values of a viterbi decoder 730 and a training-signal generator 731. Namely, a coefficient found by the CG equalizer coefficient calculator 710 is the solution of the Wiener-Hopf equation and a corresponding equation form is as follows.

First of all, a vector inputted to the equalizer is defined as Equation 18.

$$u=\{u(n),u(n-1),\ldots,u(n-M+1)\}^T \quad \text{[Equation 18]}$$

In Equation 18, 'M' indicates a tap length of the equalizer. The equalizer input vector has the following auto-correlation matrix.

$$R_u = E\{u(n)u^H(n)\} \quad \text{[Equation 19]}$$

$$= \begin{bmatrix} r(0) & r(1) & \ldots & r(M-1) \\ r^*(1) & r(0) & \ldots & r(M-2) \\ \vdots & \vdots & \ldots & \vdots \\ r^*(M-1) & r^*(M-2) & \ldots & r(0) \end{bmatrix}$$

The auto-correlation matrix of the equalizer input vector is expressed as Equation 19. And, a crossing correlation vector between the input vector of the equalizer and an ideal transmission signal x(n) the equalizer attempts to restore is expressed as Equation 20.

$$p_u = E\{u(n)x^*(n)\} \quad \text{[Equation 20]}$$

$$= \{p(0), p(-1), \ldots, p(1-M)\}^T$$

In Equation 20, p(−k) represents a crossing correlation value between x(n) and u(n−k).

The Wiener-Hopf Equation is configured as follows using the auto-correlation matrix $R_u$ in Equation 19 and the crossing correlation vector $P_u$.

$$R_u w = \begin{bmatrix} r(0) & r(1) & \ldots & r(M-1) \\ r^*(1) & r(0) & \ldots & r(M-2) \\ \vdots & \vdots & \ldots & \vdots \\ r^*(M-1) & r^*(M-2) & \ldots & r(0) \end{bmatrix} \begin{bmatrix} w(0) \\ w(1) \\ \vdots \\ w(M-1) \end{bmatrix} \quad \text{[Equation 21]}$$

$$= \begin{bmatrix} p(0) \\ p(1) \\ \vdots \\ p(1-M) \end{bmatrix}$$

$$= p_u$$

$$w = R_u^{-1} p_u$$

In Equation 21, 'w' is an equalizer coefficient vector. Hence, after the auto-correlation matrix $R_u$ and the crossing correlation vector $P_u$ have been configured by time averaging, an equalizer coefficient is found by a repetitive operation using the conjugate-gradient algorithm.

The equalizer coefficient found in the above manner is transformed into a frequency domain by an FFT unit 702 so that a multiplier 703 multiplies input data by data frequency-transformed by an FFT unit 701. Hence, a product result of the multiplier 703 corresponds to equalization of the frequency domain. Such an equalized frequency bin is reversely transformed into a time domain by an IFFT transformer 704 again.

The time-domain-transformed signal is inputted to a noise remover 720. In this case, an operation of the noise remover 720 is identical to that of the former noise remover 420 in FIG. 4. A final signal of which noise is removed by the noise remover 720 is inputted to a viterbi decoder 730 to be used in finding a decision value.

Therefore, a coefficient of the CG equalizer coefficient calculator 710 is found using the decision value found through the viterbi decoder 730 in a data section or a training sequence of a training signal generator 731 in a training sequence section. A coefficient of the noise remover 720 is then found.

Accordingly, the channel equalizing apparatus and method according to the present invention have the following effects or advantages.

First of all, in the present invention, the variation of the channel impulse response according to time can be tracked in the dynamic channel having fast channel variation as well as the static channel using the conjugate-gradient algorithm, whereby equalizing performance can be enhanced.

Secondly, the present invention obtains the accurate decision value from the viterbi decoder in the data section, thereby enabling the equalizer coefficient update using a real-time channel impulse response in the data section as well as the train signal section.

Thirdly, in the present invention, the equalizer coefficient is directly updated by receiving the reception signal and the decision value of the equalizer output using the conjugate-gradient algorithm, whereby the equalization is efficiently performed in the dynamic channel having the fast channel variation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A channel equalization method for restoring an original signal from a digital TV reception signal having passed through a channel, the channel equalization method comprising:

selecting an estimation signal from one of a previously stored training sequence in a training signal section of a received signal or a decision value of a noise-removed signal in a data section;

estimating an impulse response of the channel from the received signal having passed through the channel using a conjugate-gradient algorithm;

wherein the channel impulse response is estimated using the estimation signal;

determining an equalizer coefficient in a frequency domain using the estimated impulse response of the channel;

transforming the received signal to a frequency domain signal;

outputting an equalized signal by multiplying the frequency domain signal by the determined equalizer coefficient; and removing an amplified noise of the equalized signal using the conjugate-gradient algorithm in a time domain, wherein the estimating of the impulse response of the channel further comprises determining a point having a minimal mean square error on a mean square error plane to estimate the channel impulse response using the conjugate-gradient algorithm which finds a solution by moving only once in one direction on the mean square error plane.

2. The channel equalization method of claim 1, wherein the decision value of the noise-removed signal is decided using a viterbi algorithm.

3. The channel equalization method of claim 1, wherein estimating the impulse response of the channel further comprises;

detecting a training time of the received signal;

calculating a mutual correlation value between a training sequence having passed through the channel for the detected training time and the previously stored training sequence in a receiver; and calculating a value by multiplying the mutual correlation value by an inverse matrix of an auto-correlation matrix of the training sequence using the conjugate-gradient algorithm.

4. The channel equalization method of claim 1, wherein estimating the impulse response of the channel further comprises, calculating a mutual correlation value between the decision value and a data signal in a data section of the received signal and calculating a value resulting from multiplying the mutual correlation value by an inverse matrix of an auto-correlation matrix of the decision value using the conjugate-gradient algorithm.

5. The channel equalization method of claim 1, wherein removing the amplified noise of the equalized signal comprises:

transforming the equalized signal into the time domain;

predicting the amplified noise by receiving the transformed signal using one of a decision value of an amplified-noise removed signal or a training sequence; and whitening a noise by subtracting the predicted noise from the transformed signal.

6. The channel equalization method of claim 5, wherein predicting the amplified noise further comprises, determining a solution of a Wiener-Hopf equation for the noise prediction using the conjugate-gradient algorithm.

7. A channel equalization apparatus for restoring an original signal from a digital TV reception signal having passed through a channel, the channel equalization apparatus comprising:

an estimation signal selector for selecting an estimation signal from one of a previously stored training sequence in a training signal section or a channel-equalized signal;

a channel estimator estimating an impulse response of the channel from a received signal having passed through the channel, wherein the estimation signal is fed back to the channel estimator using a conjugate-gradient algorithm, and wherein the channel estimator determines a point having a minimal mean square error on a mean square error plane to estimate the channel impulse response via the conjugate-gradient algorithm which determines a solution by moving only once in one direction on the mean square error plane;

a coefficient calculator finding an equalizer coefficient in a frequency domain using the estimated impulse response of the channel;

a transformer transforming the received signal to a frequency domain signal;

a multiplier outputting a signal equalized by multiplying the frequency domain signal by the found equalizer coefficient; and a noise removing unit removing an amplified noise of the equalized signal using the conjugate-gradient algorithm in a time domain.

8. The channel equalization apparatus of claim 7, further comprising:

a viterbi decoder calculating a decision value closest to the noise-removed signal by receiving an output signal of the noise removing unit;

a training signal generator storing the training sequence therein; and a selector selecting one of the training sequence in the training signal section or the decision value of the noise-removed signal in the data section and feeding back the selected signal to the channel estimator and the noise removing unit.

9. The channel equalization apparatus of claim 8, wherein the channel estimator detects a training time of the received signal, calculates a mutual correlation value between a training sequence having passed through the channel for the detected training time and the training sequence previously stored in a receiver, and calculates a value by multiplying the mutual correlation value by an inverse matrix of an auto-correlation matrix of the training sequence using the conjugate-gradient algorithm.

10. The channel equalization apparatus of claim 8, wherein the channel estimator calculates a mutual correlation value between the decision value and a data signal in a data section of the received signal and calculates a value by multiplying the mutual correlation value by an inverse matrix of an auto-correlation matrix of the decision value using the conjugate-gradient algorithm.

11. The channel equalization apparatus of claim 8, wherein the channel estimator detects a point having a minimal mean square error on a mean square error plane to estimate the channel impulse response using the conjugate-gradient algorithm.

12. The channel equalization apparatus of claim 8, wherein the noise removing unit comprises:

a noise predictor predicting the amplified noise in equalization using one of a signal resulting from transforming an output of the multiplier into the time domain and the decision value of the fed-back amplified-noise removed signal or the fed-back training sequence; and a subtracter whitening a noise by subtracting the predicted noise of the noise predictor from the output of the multiplier.

13. The channel equalization apparatus of claim 12, wherein the noise predictor finds a solution of a Wiener-Hopf equation for the noise prediction using the conjugate-gradient algorithm.

14. The channel equalization apparatus of claim 12, further comprising an IFFT (inverse fast Fourier transform) unit transforming the output of the multiplier into the time domain.

15. The channel equalization apparatus of claim 7, further comprising an FFT (fast Fourier transform) unit transforming the received signal and the estimated channel impulse response into the frequency domain.

* * * * *